United States Patent [19]

Glapa et al.

[11] Patent Number: 4,757,529
[45] Date of Patent: Jul. 12, 1988

[54] CALL DISTRIBUTION ARRANGEMENT

[75] Inventors: Martin J. Glapa, St. Charles; Dorothy E. Harris, Naperville; Anthony E. Lenard, Westmont; Brian P. McMahon, Carpentersville, all of Ill.

[73] Assignee: American Telephone and Telegraph Company, AT&T Bell Laboratories, Murray Hill, N.J.

[21] Appl. No.: 834,895

[22] Filed: Feb. 28, 1986

[51] Int. Cl.⁴ .............. H04M 3/50; H04Q 3/64; H04Q 3/70; H04Q 11/04
[52] U.S. Cl. .................. 379/244; 370/60; 379/214; 379/266
[58] Field of Search ........... 379/266, 265, 309, 244, 379/213, 214, 113, 112; 370/58, 60

[56] References Cited

U.S. PATENT DOCUMENTS

| | | | |
|---|---|---|---|
| 3,297,829 | 1/1967 | Germantown | 379/208 |
| 3,969,589 | 7/1976 | Meise, Jr. et al. | 379/266 |
| 4,048,452 | 9/1977 | Oehring et al. | 379/113 |
| 4,145,578 | 3/1979 | Orriss | 379/188 |
| 4,289,934 | 9/1981 | Pitroda et al. | 379/269 |
| 4,436,962 | 3/1984 | Davis et al. | 379/211 |
| 4,656,624 | 4/1987 | Collins et al. | 370/60 |

FOREIGN PATENT DOCUMENTS

55-12851 2/1980 Japan.

OTHER PUBLICATIONS

R. Sedgewick, Chapter 11, "Priority Queues", *Algorithms*, Addison-Wesley Pub. Co., 1983, pp. 127-141.

*Primary Examiner*—Thomas W. Brown
*Attorney, Agent, or Firm*—Peter Visserman

[57] ABSTRACT

In a telecommunication switching system, incoming calls of various call types directed to a group of associated subscriber terminals are queued by call type and distributed on a priority basis. A separate queue is created for each call type and a table is provided which defines a number of priority levels and the call types to be served in each priority level. A priority frequency array is used for each of the terminals to assure that each terminal serves calls at the various priority levels with a prescribed frequency. When calls of different types but having the same priority level are waiting to be served, the oldest call will be selected on the basis of a time-of-day stamp recorded with each call on queue.

12 Claims, 3 Drawing Sheets

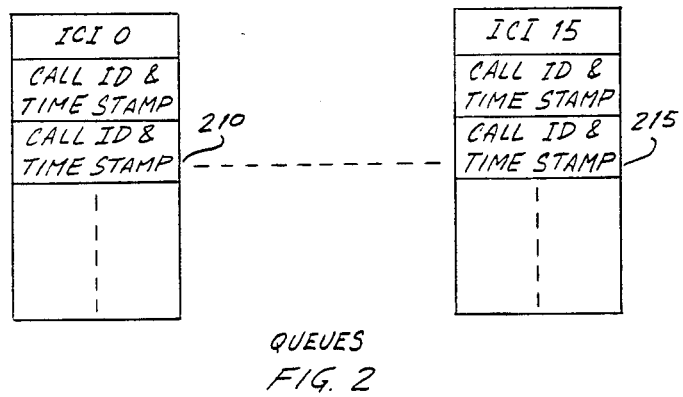
FIG. 2 QUEUES
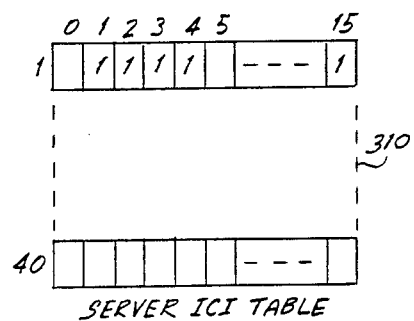
FIG. 3 SERVER ICI TABLE
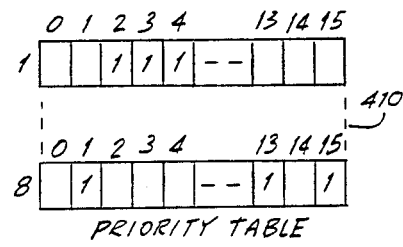
FIG. 4 PRIORITY TABLE
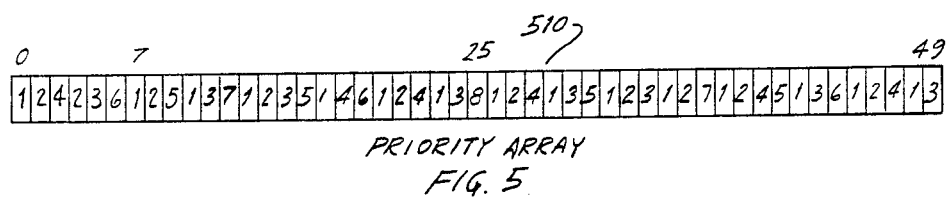
FIG. 5 PRIORITY ARRAY
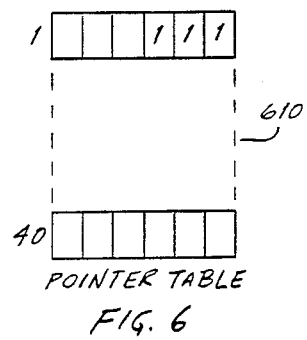
FIG. 6 POINTER TABLE
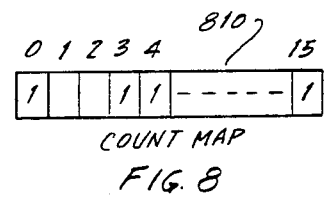
FIG. 8 COUNT MAP

CALL DISTRIBUTION ARRANGEMENT

TECHNICAL FIELD

The invention relates to telecommunication switching systems and particularly, to the distribution of incoming calls to subscriber terminals.

BACKGROUND OF THE INVENTION

It is not uncommon for large business subscribers to have several directory numbers and to have a large number of attendants answering incoming telephone calls. These calls may be of different types differentiated, for example, by origination (e.g. from a private network trunk) as well as by the directory number dialed by the calling party. In modern telecommunication switches adapted for use in the so-called Integrated Services Digital Network (ISDN), the switching system accumulates data including data defining the call type for each call in progress. A subscriber may wish to have certain of the different call types served before others, in accordance with a prioritized ranking. In ISDN systems where several different call types are processed, not all servers are necessarily equipped to handle all of the call types. Thus, incoming calls must be selectively distributed to those terminals which are available to serve the particular type of incoming call.

The number of incoming calls for a particular customer frequently exceed the capability of the available servers to handle the calls. In such a case, the calls may be queued and distributed as server terminals become available. A recognized problem is the need for equitable distribution of waiting calls to servers, particularly the distribution of calls of different types on a priority basis.

SUMMARY OF THE INVENTION

The foregoing problem is solved and an advance in the art is made in one particular embodiment of this invention by storing different types of calls directed to a group of server terminals in different queues in the memory of a communications control processor, thereby creating a separate queue for each call type, detecting when a terminal becomes available, and distributing waiting calls from the different queues to the servers in accordance with defined priority values assigned to the different call types.

A priority table in the processor memory defines a number of priority levels and call types to be served in each priority level. All incoming calls directed to a server terminal or group of terminals are examined for call type and data defining different types of incoming calls is entered in the different queues thereby creating a separate queue for each type of call directed to that terminal or group of terminals. After a terminal becomes available, call type data corresponding to a predetermined priority level is obtained from the priority table and an incoming call registered in queue and corresponding to the call type defined by the table, is connected to the available terminal.

A priority array stored in the processor memory defines a sequence of priority values. The priority value obtained from the array defines the priority level to be served and is used to obtain corresponding call type data from the priority table. In one specific embodiment, the priority array is a sequential array having a number of positions each defining a priority level. Certain priority levels are defined in the array with greater frequency than others to assure that higher priority calls are served more frequently than others. Advantageously, this arrangement provides a nonblocking call handling system in which all priority levels are served with a predetermined frequency.

A pointer address table stored in the processor memory defines a location in the priority array for each of the terminals of an associated group of terminals. The pointer is used to read a location of the priority array defining a priority level to be handled by the terminal when it becomes available. The pointer is incremented each time after the array has been read. Advantageously, this makes it possible for each terminal to handle a different level priority call as defined by the priority array, each time it becomes available.

More than one call type may be assigned to the same priority level and when two or more calls of the same priority level but stored in different queues are ready to be served, the call which has been waiting longer will be selected. A time stamp indicative of the time of arrival is recorded for each call as it is entered in a queue, and the associated time of day values are compared when a priority level is selected for service. Advantageously, this allows a large number of types to be handled in a limited number of different priority levels.

BRIEF DESCRIPTION OF THE DRAWING

FIG. 2 is a representation of a portion of the memory of the processor of FIG. 1 showing a plurality of queues;

FIGS. 3 and 4 are representations of bit maps in the memory of the processor of FIG. 1;

FIG. 5 is a representation of a priority array stored in the memory of the processor of FIG. 1;

FIG. 6 is a representation of an address table stored in the memory of the processor of FIG. 1;

FIG. 8 is a representation of a bit map in the memory of the processor of FIG. 1.

DETAILED DESCRIPTION

Figure 1:
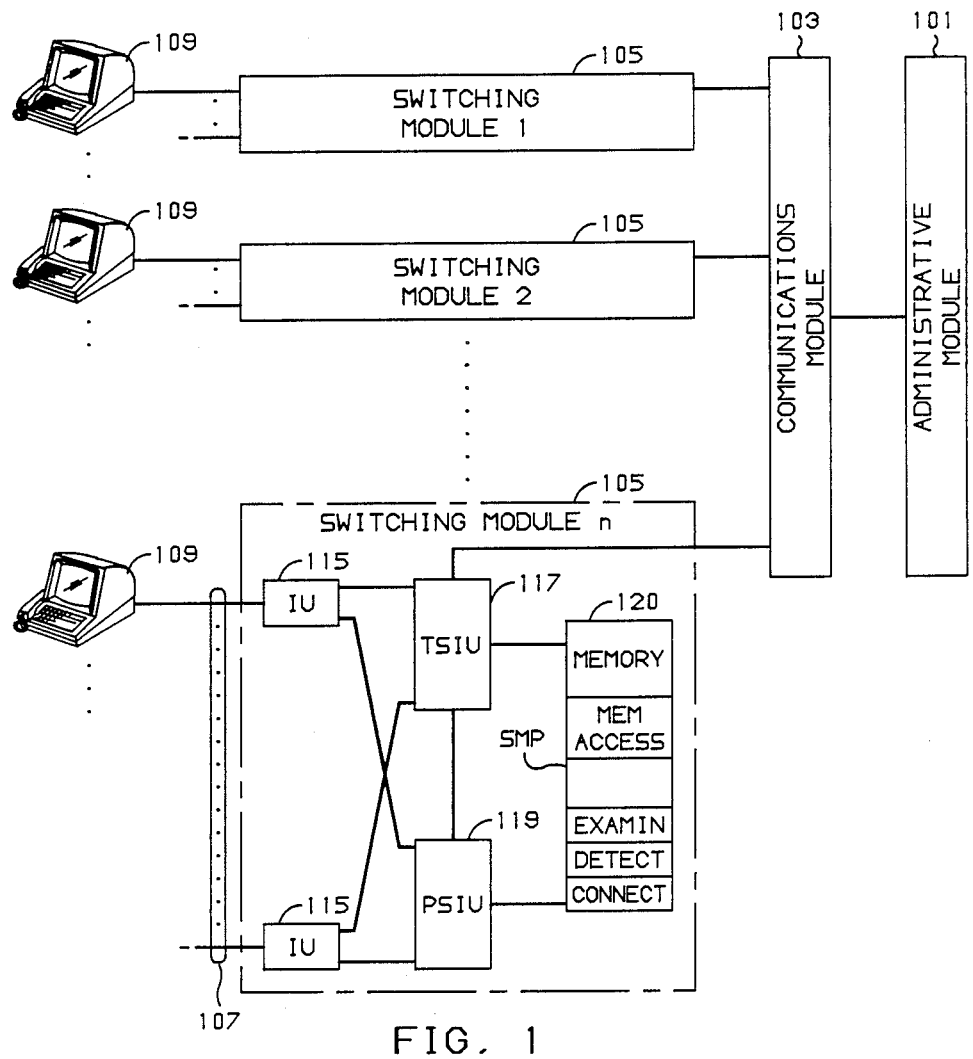
FIG. 1 is a block diagram representation of a telecommunication switching system including a communications processor.

To illustrate the principles of the invention, a central office telecommunications switching system, as outlined in FIG. 1 is employed. The system, for example, may be the AT&T company 5ESS Switch which is commercially available and is described in *AT&T Technical Journal*, July-August 1985, Vol. 64, No. 6, Part 2. Shown in FIG. 1 is the basic switch architecture which includes an administrative module 101 which performs the system level functions such as common resource allocation and maintenance control and some call processing functions, in addition to collecting billing data. The administrative module 101 is connected to a communications module 103, which in turn is connected to a plurality of switching modules 105. The basic function of the communications module is to provide a communication path between the various switching modules and between the administrative module and the switching modules, and to provide appropriate synchronization signals to the switching modules. Hardware and software for carrying out the functions of these modules are well known. The detailed operations of the these functions are not essential to an understanding of the invention and are not described in detail herein.

Each of the switching modules 105 shown in FIG. 1 is identical and connects to input/output lines 107 which may be subscriber lines and interconnecting trunks to other switching systems. The subscriber lines may be connected to subscriber terminals 109 which may be ISDN subscriber terminals capable of handling both voice and data. For the purposes of this description, the terminals may be conventional telephone sets. Each of the switching modules 105 may have several hundred connected lines and trunks and several of these lines may be used by a single commercial customer such as an airline company which has a number of server terminals. Each of the lines 107 terminates in the switching module 105 in one of a plurality of interface units 115, which may be trunk interface units or digital line interface units.

Each of the interface circuits 115 is connected to a time slot interchange unit 117 which provides a switching stage for voice communications between the various interface units 115 and between interface units and the communications module 103. FIG. 1 depicts a switch configuration adapted for ISDN in which the input/output lines 107 comprise B channels for conveying digitized voice and data and D channels for conveying packetized data. In such a system, the interface units 115 separate the B channels from the D channels, directing B channel information to the time-slot interchange unit 117 and directing D channel packets to the packet switch interface unit 119. This unit includes a number of protocol handlers for establishing and maintaining proper protocol with the subscriber units 109. Certain of the received packets are identified as containing call signaling information. These are passed to the switching module processor 120. In conventional systems, not adapted for ISDN, the packet switch interface unit is not employed. For the purposes of illustrating this invention, either system may be considered. The invention has particular application where a number of different types of calls are directed to a server station. Such may be true in conventional systems but is particularly true for ISDN where a large number of call types will be available. A more detailed description of a switching system adapted for ISDN may be found in the patents of M. J. Beckner et al., entitled "Integrated Packet Switching and Circuit Switching System", U.S. Pat. No. 4,592,048 and "Distributed Packet Switching Arrangement", U.S. Pat. No. 4,596,010, both assigned to the assignee of this application.

The switching module processor 120 is a well-known microprocessor and may be, for example, the Motorola 68000 microprocessor. This processor is programmed to control the elements of the switching module to perform call processing functions in the switching module. These include such basic call processing functions as detecting an origination from a subscriber, providing dial tone, receiving digits, detecting busy/idle state of a subscriber set and establishing connections through a network. The processor 120 includes the memory for storing tables and data arrays as depicted in FIGS. 2 through 6 and 8. It also includes standard memory access. Circuitry for reading and writing the memory as well as the hardware and software for executing the various specific functions depicted in FIG. 7 and such functions as examining incoming calls for call type, detecting an idle server, and connecting calls on a designated queue to an identified server. Stored program control systems for performing such functions have been in commercial use for over 20 years and hence details of the operation of the switching module processor are not described herein.

When a commercial subscriber such as an airline has a number of attendants for serving incoming calls, it is common to distribute the incoming calls among the several servers by means of the switching system. Typically, the server terminals are divided into groups and the distribution is made on a group basis. In the event that all the servers of a group are busy when a call comes in, a queuing arrangement is provided in which the identity of a waiting call is recorded. The servers' terminals are monitored periodically and when a server in the group becomes available, the appropriate connections are established to connect one of the waiting calls to the available server's terminal.

In this illustrative embodiment, it is anticipated that incoming calls will be of a variety of different types such as might be encountered in the Integrated Services Digital Network (ISDN). The different call types may be differentiated on the basis of the facilities used to transmit the call or on the basis of dialed directory numbers. For example, recognized call types may be calls that were forwarded from another directory number, calls that were originated by dialing an 800 number, or calls received from other designated facilities such as a corporate network or the public network. Furthermore, a subscriber may direct the public to use different directory numbers or 800 numbers for different types of inquiries. Modern switching systems are well equipped to distinguish between such different call types. In ISDN, call data accompanying each call includes an ISDN Call Identifier (ICI) which defines the call type. For ISDN, up to 64 different call types may be specified. In this illustrative embodiment, however, up to 16 different call types may be selected by a subscriber for a server group and each type is provided with a separate queue in the memory of processor 120 as shown in FIG. 2. Queuing may be done in any number of well-known ways. In the present system, all incoming calls directed to a group of servers are inspected for call type. A new queue or subqueue is established under a queue header each time a call type of the allowed set is found for which a subqueue does not already exist. The subqueue is relinquished when there is no longer any call waiting on that subqueue. When call data identifying a call is entered on queue, it is accompanied by a time-of-day stamp, which is used to determine how long a call has been on queue. FIG. 2 shows that there may be as many as 16 queues, one for each of 16 call types, for each group of servers. This number is independent of the size of the server group and is the same even if there is only one server in the group. Associated with each queue is a counter which indicates the number of calls in the queue. A count map 810, depicted in FIG. 8, records which of the 16 call types has any calls on queue.

The principles of this invention apply equally to a subscriber employing a small number of servers, even if there is only one server, and those employing a large number. In one particular application, as many as 40 server terminals are grouped in a single group. Certain of the stations may be assigned to handle only certain types of calls. A server ICI table is provided in the memory of processor 120 for each terminal in the group defining the call types which the server can handle. As shown in FIG. 3, in this illustrative system there are 40 individual bit maps 310, one for each server, each defining up to 16 different call types. By way of illustration, as depicted in FIG. 3, the first server terminal is assigned to handle call types 1, 2, 3, 4, and 15. A subscriber may alter the assignment for each server as business conditions warrant. Furthermore, the subscriber may assign a priority to each selected call type, to assure that certain types of calls are handled before others. In this illustrative system, eight different priority levels are provided, ranging from 1 through 8 with 1 being the highest order priority and 8 being the lowest order priority. FIG. 4 represents a table having eight separate priority bit maps 410 in the memory of the module processor 120, one for each priority level. Each of the priority maps has 16 entries, one for each call type. Thus, several of the 16 selected call types may be assigned to the various priority levels.

To assure that calls of all priorities are served with a prescribed frequency, a priority frequency arrangement is used. This is depicted in FIG. 5 as a sequential array 510 stored in the memory of the switch module processor 120. In this illustrative system, the priority array consists of 49 entries in which the highest priority, priority 1 occurs 15 times, priority 2 occurs 10 times, priority 3 occurs 7 times, priority 4 occurs 6 times, priority 5 occurs 4 times, priority 6 occurs 3 times, priority 7 occurs 2 times, and the lowest priority, priority 8, occurs once. The priority entries in the array are distributed essentially on an arbitrary basis and any number of different configurations of priority values may be used. This priority array is used for all of the servers of a group and assures that each server can serve all priority levels.

Each server will proceed through the priority array 510 independent of the other servers, progressing to a next position in the array each time a new call is to be served. A pointer table stored in the memory of processor 120, is depicted in FIG. 6. The table has a pointer address 610 for each server terminal and is used to record a position in the priority array of FIG. 5. Each time a new call is to be served by a server terminal, the corresponding entry of the pointer is read and its contents is used to read the location of the priority array 510 defined by the pointer. The pointer is incremented each time after it is used. The illustrative array of FIG. 5 has 49 locations. Accordingly, the pointer is incremented to value 48 and thereafter returned to zero, causing a repeated and regular progression through the priority array 510.

Figure 7:
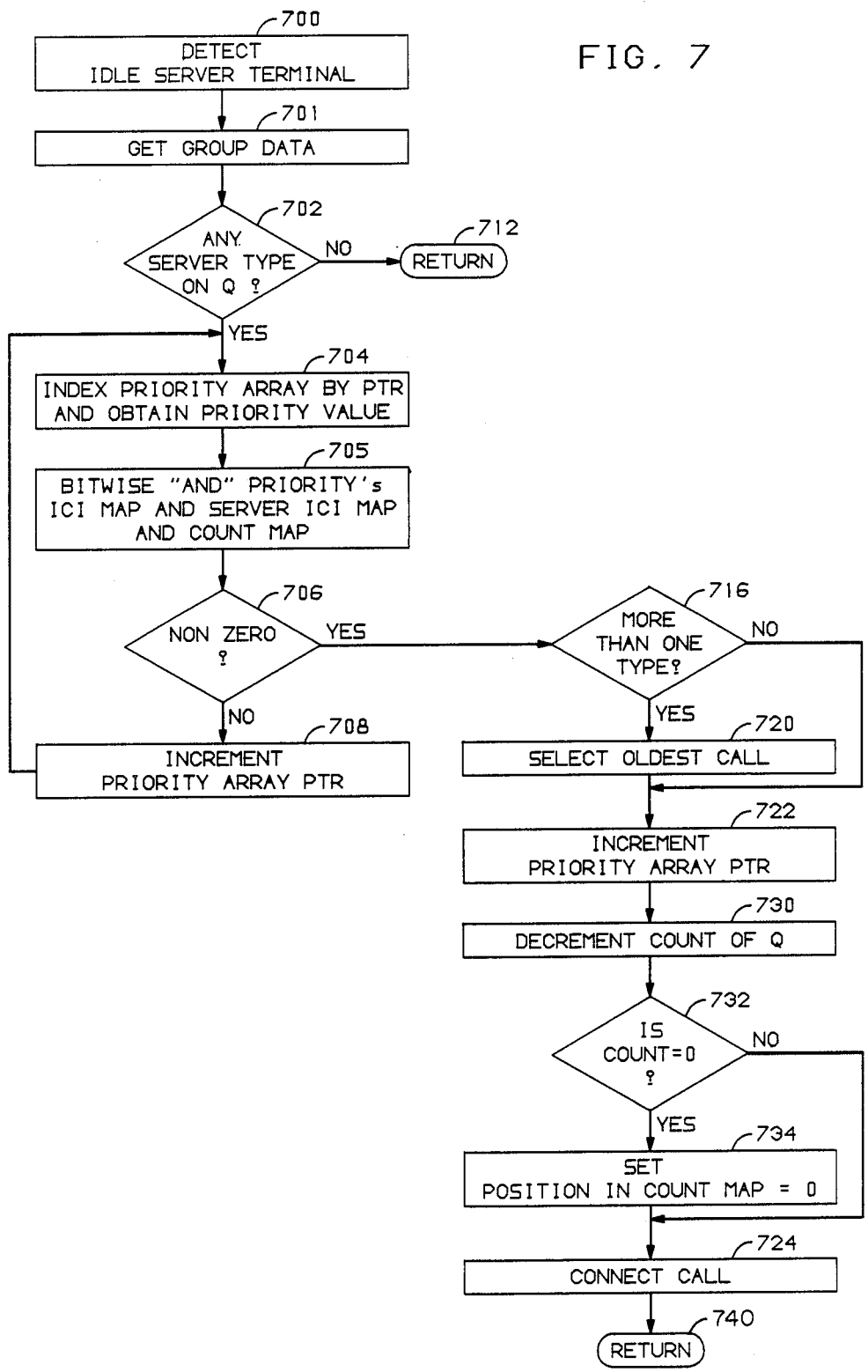
FIG. 7 is a sequence flow diagram of a method of distributing incoming calls to servers.

FIG. 7 is a sequence diagram showing the sequence of steps executed when a server terminal becomes available to handle a call and at least one call is waiting in the queues depicted in FIG. 2. The initiation of the sequence is depicted in block 700. As indicated earlier, the server terminals for one customer are divided into groups of no more than 40 each. A preliminary step in the sequence of FIG. 7 is to obtain the data pertaining to the group of which the available server terminal is a member. This data is depicted in FIGS. 2 through 6. The action of obtaining this data is depicted in block 701. Next, in block 702 a test is made to determine whether there are any calls on queue which can be handled by the available server. In this process, the server ICI table shown in FIG. 3 is consulted and the bit map corresponding to the available server is read. This map is ANDed with the count map 810 of FIG. 8 to determine whether there are any calls on queue which this server can handle. If not, a return is made in block 712, avoiding a fruitless execution of the sequence. Otherwise, the next step is to obtain a priority value from the priority array 510 in block 704. The priority array 510 of FIG. 5 has an address associated with it which is indexed by the server's pointer address 610, depicted in FIG. 6. The resultant address reaches the specific position in the priority array which defines the priority of the next call to be handled by this server. For example, if this is server 1, the pointer value shown in FIG. 6 is 7. In the selected position of the priority array 510 a specific priority level, a number from 1 through 8, is defined as shown in FIG. 5. Position 7, for example, defines priority level 1. Corresponding to this priority level there is an entry in the priority ICI map 410 as depicted in FIG. 4. This shows that call types 2, 3, and 4 are to be served at this level. A logical AND of the bit positions of ICI maps 310, the priority map 410, and the count map 810 is computed in block 705. The first map indicates the call types which may be served by the server, the second defines which call types are to be served in the current priority level, and the third indicates what call types are waiting to be served. For example, referring to FIGS. 3, 4, and 8, if the server is server 1 and the selected priority is priority 1 then, as indicated in FIG. 3, the server can handle call types 1, 2, 3, 4, and 15. As is depicted in FIG. 4, call types 2, 3, and 4 have the priority 1 assigned to them. According to the count map 810, only calls of the call types 0, 3 and 4 are waiting. Thus, in this example, the result of the combination of these maps is a positive indication for call types 3 and 4.

Referring back to FIG. 7, a test is made in decision block 706 to determine whether the logical AND operation provided a non-zero result. If the result is zero, indicating that there are no calls to be served by this server at this priority level, a transfer is made to block 708 where the server's priority array pointer is incremented. Thereafter, the sequence of steps of block 704 through 706 are repeated to determine if calls of the priority level defined by the next pointer position can be handled. If the test in decision block 706 is non-zero, at least one call type was found on queue which this server can serve and an advance is made to block 707. A further test is made in blocks 716 to determine whether there is more than one call type to be served. If so, the oldest call is selected in block 720. This selection is done on the basis of a time stamp derived from a time of day clock provided by the system, and which is entered in the queue at the time that the call is placed on queue. It may be easily determined which is the oldest call by comparison of the time stamps. After a call selection has been made in block 720 or if the test of block 716 shows that there is only one call type to be served, an advance is made to block 722. In block 722 the priority array pointer is incremented and written in the appropriate location of the pointer table of FIG. 6 in anticipation of the subsequent operation by this particular server. Thereafter an advance is made to block 730 where the appropriate queue counter is decremented by 1, indicating that a call is being served. After the decrement, a test is made in block 732 to determine whether the count is now zero. If so, the position in the count map of FIG. 8 which corresponds to the call type being served is set to zero in block 734 and an advance is made to block 724. Otherwise, an advance to block 724 is made directly from block 732. In block 724, a message is provided to the system's call handling program to connect the selected call to the identified server in a well known manner. A return is made in block 740.

It is to be understood that the above-described arrangement is merely illustrative of the application of the principles of the invention; numerous other arrangements may be devised by those skilled in the art without departing from the spirit and scope of the invention. The switching system referred to in the detailed description is just one of several systems to which the invention has application. The invention is equally applicable to switching systems in the public switching network and private switching systems. The invention has application to small groups of servers, even if there is only one server in a group as well as large groups, where different types of calls are to be served on a priority basis.

What is claimed is:

1. In a communication switching system comprising a plurality of connected subscriber terminals, the method of distributing incoming calls of different call types to said terminals, comprising the steps of:

storing call data for incoming calls of different call types, directed to one of said terminals, in different queues, thereby creating a separate queue for each call type for said one terminal;

detecting when said one terminal becomes available to handle a call;

selecting one of said call types in accordance with a predetermined priority scheme; and connecting to said one terminal a call identified in the one of said queues corresponding to said selected call type.

2. In a telecommunication switching system having a plurality of subscriber terminals connected thereto, a method of distributing incoming calls of differing call types to a group of terminals on a priority basis, comprising the steps of:

creating a priority table associating call type and priority level data;

examining each incoming call directed to said group of terminals for call type;

storing call data identifying examined incoming calls in a plurality of different queues corresponding to different call types, thereby creating a separate queue for each type of call directed to said group of terminals;

monitoring said terminals and detecting an available terminal;

upon detection of an available terminal, obtaining from said priority table call type data corresponding to a predetermined priority level; and connecting to said detected available terminal an incoming call from a queue corresponding to the obtained call type.

3. The method in accordance with claim 2 further comprising the step of creating a priority array defining a sequence of priority values, and wherein said step of obtaining call type data includes the step of reading a designated position of said array defining a priority level and the step of reading call type data corresponding to said defined priority level.

4. The method in accordance with claim 3 wherein said step of creating a priority array, includes creating a sequential array having a number of positions each defining a priority level and in which certain priority levels are defined with greater frequency than other priority levels.

5. The method in accordance with claim 3 further comprising the steps of generating and storing a pointer address defining a location in said array for each terminal of said group, and wherein said step of reading a designated position of the said array includes the step of reading the pointer address for said detected available terminal and generating an array address based on said read pointer address.

6. The method in accordance with claim 5 further comprising the step of incrementing the pointer address for a terminal to a new value each time after said step of generating an array address, whereby a terminal may serve a call of a different priority level each time that the terminal becomes idle.

7. The method in accordance with claim 2 wherein said step of storing call data includes storing time stamp data indicative of the time of arrival of each incoming call, wherein said step of creating a priority table includes the step of assigning more than one call type to a single priority level, and said step of connecting includes the steps of determining which of the queues defined by the call type data for a selected priority level has the oldest call, and connecting the oldest call to the detected available terminal.

8. In a telecommunication switching system for handling a plurality of types of calls and having a call server terminal connected thereto and having a priority table defining a plurality of priority levels and call types to be served in each priority level, and having a server table defining call types to be handled by said call server terminal, a method of connecting calls of differing call types to said terminal on a priority basis, comprising the steps of:

examining incoming calls for call type;

storing for each incoming call directed to said terminal call data defining the incoming call in a queue corresponding to the call type of the incoming call;

selecting a priority level in said priority table;

combining data from said server table with data from said priority table defining call types to be served for the selected priority, to define call types having the selected priority which may be served by said terminal; and connecting to said terminal an incoming call defined in a queue corresponding to the call type data generated by said combining step.

9. The method in accordance with claim 8 and wherein said step of storing call data in said queues comprises the step of storing time stamp data indicative of the time of arrival of incoming calls, said method further comprising, after the combining step, the step of determining whether more than one call type is defined by said combined data and, if more than one call type is defined, the step of selecting the oldest call from the queues corresponding to the call type data defined by said combining step.

10. The method in accordance with claim 8 wherein said telecommunication switching system has a priority array defining a sequence of priority values and having an array pointer address defining a location in said array, and said step of selecting a priority level further comprises the step of obtaining said array pointer address and the step of reading a location of said array defined by said obtained pointer address.

11. A telephone switching system for use in combination with a plurality of subscriber terminals and comprising:

memory means including a priority table containing data defining a priority level for each of a plurality of different call types;

means for examining incoming calls directed to a predetermined group of said terminals for call type;

means for storing data defining examined incoming calls in said memory means in queues by call type;

means for detecting an available terminal in said group and for generating an output message defining said available terminal; and connecting means responsive to said output message for reading from said priority table call type data corresponding to a predetermined priority level and for connecting to said available terminal an incoming call defined by data stored in one of said queues corresponding to said call type obtained from said priority table.

12. A telephone switching system in accordance with claim 11 wherein said memory means further includes a priority array defining a sequence of priority values, and a pointer address table defining a location in said array for each terminal of said group and wherein said connecting means is further responsive to said output message for reading said pointer address table and reading said location in said priority array for said available terminal to obtain from said priority array a priority value defining said predetermined priority level.

* * * * *